United States Patent Office 3,581,331
Patented June 1, 1971

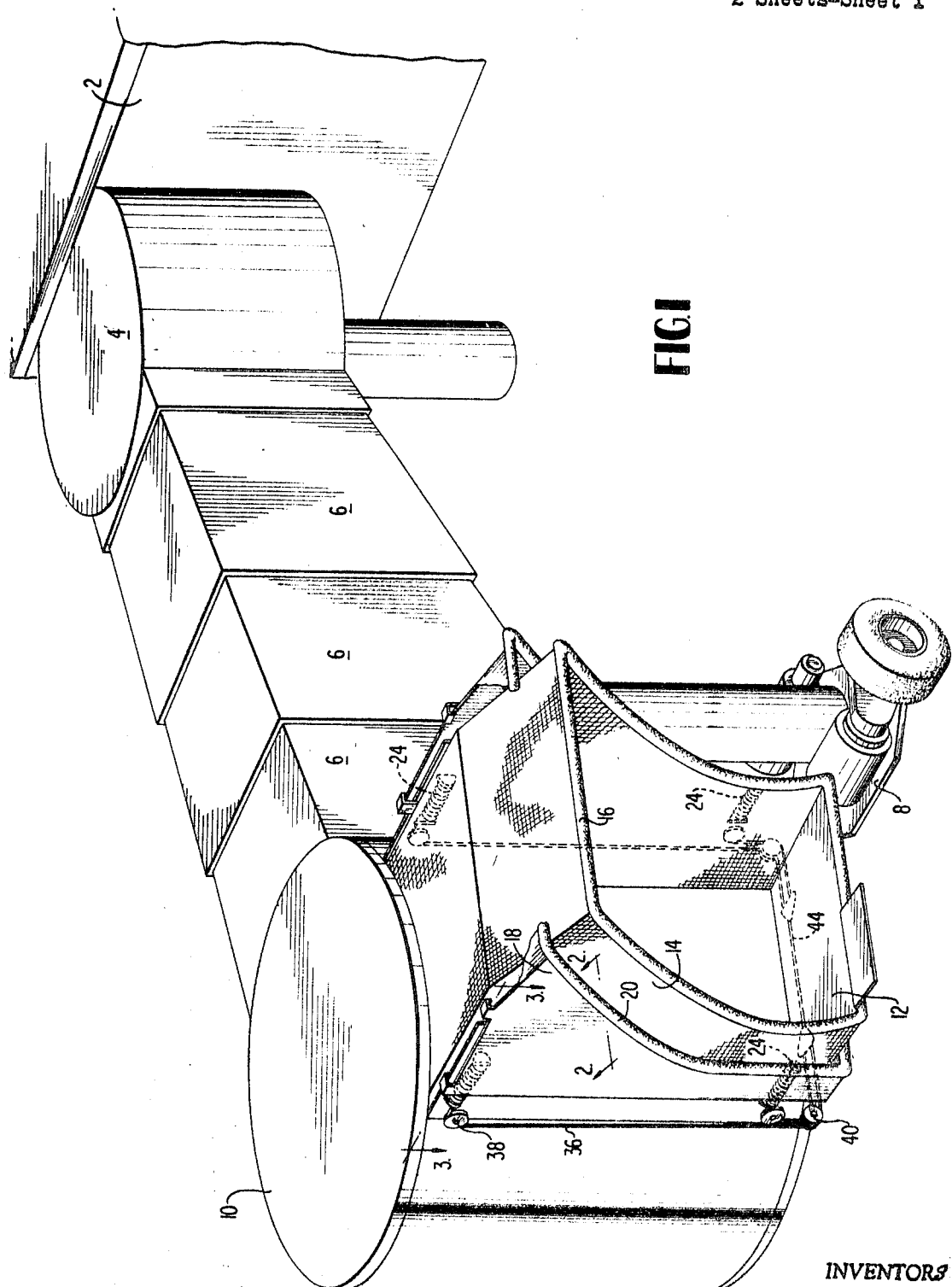

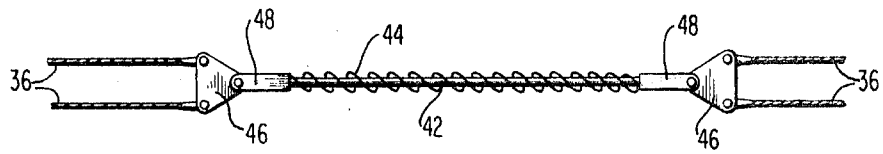
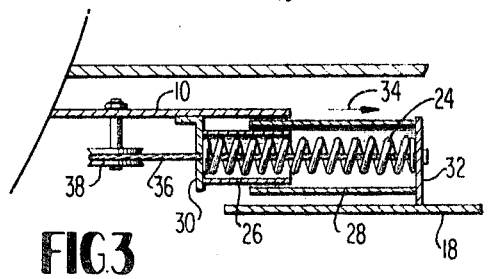
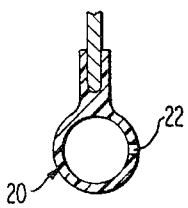
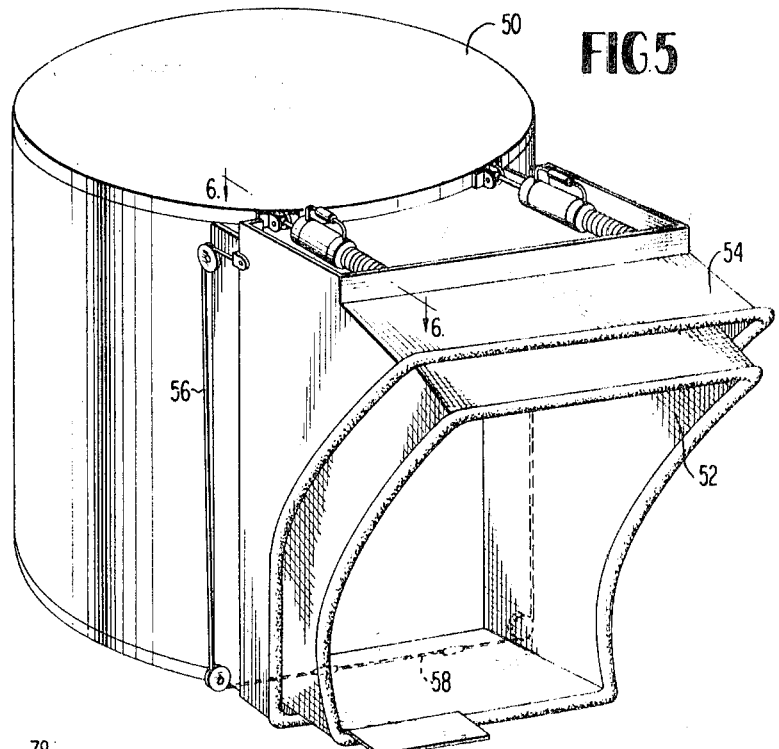
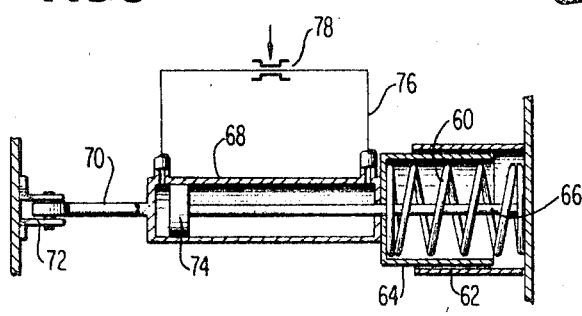

3,581,331
FIRE PROTECTION SHIELD
Perry N. Fisher, Huntsville, and Howard E. Morris, Florence, Ala., assignors to Brown Engineering Company, Inc.
Filed Oct. 1, 1968, Ser. No. 764,276
Int. Cl. B65g *11/00*
U.S. Cl. 14—71                                    15 Claims

ABSTRACT OF THE DISCLOSURE

A shield for enclosing a platform between two enclosures is normally held in a retracted position spaced from one of the enclosures. In the presence of abnormally high temperatures generated by a fire, the shield is moved to its extended position where it encloses the platform. The shield, which may include a resilient sealing rim, is covered with a heat insulating material which expands in the presence of fire.

BACKGROUND

Although this invention may be adapted to operate with various types of structures, it is principally intended for use with passenger loading bridges for enplaning and deplaning passengers at aircraft terminal facilities. Loading bridges of this type are usually moveable and extend from the stationary airport terminal building to the door of an aircraft located adjacent to the building.

It is customary to provide the outer end of such a bridge with a weather hood which shields passengers from wind, rain, and other adverse weather conditions. The weather shields are formed of a supporting framework and a flexible fabric material, and may include a cushioning rim which contacts the aircraft.

A disadvantage of the prior art devices in this field is that the flexible weather shields do not offer the passenger any material protection from excessive heat in the event of fire.

SUMMARY

This invention is addressed to a fire shield which is constructed in a manner which will provide a substantial degree of protection to passengers departing from an aircraft when there is a fire in the vicinity of the aircraft. Briefly, the improvements disclosed herein involve the construction of the shield which includes a sealing rim formed of a material which will expand to improve its sealing characteristic in the presence of excessive heat; and, a novel manner of supporting the shield so that it will be positively urged toward the aircraft when exposed to excessive temperatures.

One manner of providing the expansible sealing rim is to provide a coating of an intumescent fireproofing material on the portion of the fire shield which will contact the aircraft body. This material expands to many times its original volume in the presence of a fire and it may be applied so that the surface temperature on the interior of the shield does not exceed 350° F. after the outside surface thereof has been subjected to a temperature of 1,800° F. for a period of five minutes.

The shield itself is normally held in a retracted position where it will not contact the aircraft body. However, thermally-responsive means are arranged to move the shield to a position where its sealing rim will rest against the aircraft body to surround the door or other portal. Although various means may be utilized to accomplish this end within the spirit of the invention, it is preferred to utilize a resilient biasing means, the action of which is restrained by a heat-destructible connector. A fluid-operated (liquid or gas) retarder may be employed to control the velocity of the shield as it moves from its retracted position to its extended position to prevent any damage to the airframe.

The object of the various phases of this invention are to provide a fire shield which is relatively simple in construction but which offers a high degree of fire protection to persons moving between two enclosures. The particular manner of accomplishing this objective will be appreciated upon studying the following description of only two of many possible forms which the invention may assume.

DESCRIPTION OF THE DRAWINGS

FIG. 1 shows an airport terminal installation with a passenger loading bridge which embodies the features of this invention;

FIG. 2 is a view showing a preferred construction of the sealing rim located at the outer extremity of the fire shield;

FIG. 3 is a view taken along the line 3—3 in FIG. 1, showing one suitable means for moving the shield to its extended position;

FIG. 4 shows a heat-destructible device which may be used to hold the shield in its normal retracted position;

FIG. 5 shows a modified form of the invention wherein only two devices are arranged to move the shield to its extended position; and FIG. 6 shows the means used in the embodiment of FIG. 5 for moving the shield to its extended position.

DESCRIPTION OF THE DISCLOSED EMBODIMENTS

FIG. 1 shows a suitable environment for this invention, including an aircraft terminal building 2, a rotunda 4 and the bridge which includes a series of telescopic sections 6. One of the telescopic sections is supported by a hoist and drive unit 8 which manipulates the bridge toward and away from aircraft on the ramp. The unit 8 can raise or lower the bridge, and it is positively driven on the ground to swing the bridge about the central vertical axis of the rotunda 4.

Passengers may move between an aircraft and the cab 10 by walking across the platform 12 when it is aligned with the aircraft door. During such movement, the passenger is protected from the weather by a flexible shield 14 which has a rim 16 resting against the aircraft body. The weather shield 14 together with the platform 12 are movable in an arcuate path generated from the central vertical axis of the cab 10.

Under normal conditions, the aircraft body is only contacted by the weather shield 14. However, in case of fire, a rigid fire shield 18 is moved from a retracted position shown in FIG. 1 to an extended position where its sealing rim 20 will rest against the aircraft body. The top of the shield 18 is broken away in FIG. 1 for purposes of illustration. The shield 18 may be made of metal and, together with the sealing rim 20, it is preferably coated with an intumescent fireproofing material. This material is applied to the shield 18, the cab 10 and the telescoping section 6 in sufficient thickness to maintain their interior walls at a temperature not exceeding 350° F. after their exterior surfaces have been exposed to a temperature of 1,800° F. for a period of five minutes.

As illustrated in FIG. 2, the rim 20 is a tubular body having a pair of radially extending anchoring flanges which receive the edge portion of the metallic portion of the shield. Preferably, the rim is formed of a material such as the tetrafluoroethylene polymer made and sold by the E. I. du Pont de Nemours Company under the name Teflon. The tube is provided with an air vent opening 22 which permits the escape of expanded air generated in the presence of a fire; and, the outer surface of the extrusion is coated with the previously-described intumescent materials.

According to the preferred embodiments, the fire shield is resiliently biased toward its extended position, but is held in its retracted position against the biasing force by means of a heat-destructible member. In FIG. 1, it will be seen that at each of the four corners of the shield there is a compression spring 24. This spring acts between a portion of the cab 10 and the fire shield 18, tending to move the shield to its extended position. Referring to FIG. 3, it will be noted that the spring 24 is enclosed between a pair of telescoping housings 26 and 28 which may be coated with the insulative material described above in order to preserve the tensile strength of the springs. A member 30 on housing 26 is attached to the cab 10, while an element 32 attaches the telescoping housing 28 to the fire shield 18. The effect of the spring 24 is to move the elements 28, 32 and 18 approximately twelve inches in the direction represnted by the arrow 34.

The force generated by each spring 24 is normally counteracted by a tension member such as the cable 36 which, as seen in FIG. 1, passes over a pair of pulleys 38 and 40 and connects to a heat-destructible link 42.

Each of the four springs 24, is constructed and housed in a manner shown in FIG. 3. The four restraining cables 36 are led around their respective pulleys to the exposed lower portion of the shield. There, as shown in FIG. 4, the cables are connected by yokes 46 and connectors 48 to a heat-destructible link 42. Wire 44 or other material may loosely be wound about the link 42 to offer some degree of abrasion resistance. The link itself may be a thermoplastic material which weakens when subjected to temperatures of a magnitude expected to exist in the vicinity of a fire. A yielding temperature of 500° F. is suitable. At some point, when exposed to a fire, the link 42 will yield to release the cables 36, permitting the compression springs 24 to move the shield to its extended position against the body of an aircraft. The construction and location of the springs 24 is such that they will tend to urge the shield 18 outwardly beyond the sealing rim 16 of the weather hood. Therefore, when the sealing rim 20 of the fire shield strikes the aircraft, resilient biasing forces created by the springs 24 will hold the rim 20 in firm engagement with the wall of an aircraft body.

In order further to promote the sealing between the fire shield 18 and the aircraft, the sealing rim is coated with the previously-described fireproofing material which expands to sixteen times its original thickness when subjected to excessive temperatures. Therefore, as the insulative material expands to at least several times its original thickness after the rim 20 contacts the wall of the aircraft, a more secure seal will result to improve the degree of protection from fire.

In the modified form of the invention shown in FIG. 5 a cab 50 carries a weather shield 52 and a fire shield 54. The top of the shield 54 is not shown for clarity of illustration. As in the previous embodiment, the fire shield is resiliently biased by springs toward its extended position, but is restrained in its retracted position by means of a fusible link. In this case, the restraining means involves cables 56 which are attached directly to the shield 54 and extend over pulleys to a point where they connect to the heat-destructible link 58. In this modified form of the invention, only two springs are used. As shown in FIG. 6, one of these springs 60 acts between the fire shield and a stationary portion of the cab and is enclosed by a pair of telescoping tubular sections 62 and 64. A piston rod 66 extends centrally through the spring into a cylinder 68 which is held stationary with respect to the cab by means of a rod 70 and bracket 72. The rod 66 extends into the cylinder 68 and carries a piston 74 which is movable from the retracted position illustrated to an extended position. The opposite ends of the cylinder are interconnected by a conduit 76 which includes an adjustable valve or an orifice plate 78 for metering the flow of fluid between the ends of the cylinder 68. The cylinder 68 and piston 74 form an expansible chamber device, and the presence of the orifice tends to resist any rapid change in the volume of the chambers on opposite sides of the piston 74 as the shield 54 moves to its extended position. This limits the velocity of the fire shield as it moves from its retracted position to its extended position. Such control is desirable since it reduces the force of impact when the sealing rim on the fire shield strikes the wall of an aircraft. This protects the aircraft against accidental breakage of the thermal fuse and obtains a better seal between the sealing rim of the fire shield and the aircraft body.

This specification has disclosed only two possible arrangements which are capbale of producing the advantageous results of this invention. Numerous variations thereof and modifications thereto may be made according to the principles of the invention which is not limited only to the disclosed embodiments, but encompasses all alternative constructions thereto falling within the spirit of the following claims.

In the claims:

1. Apparatus for providing safe passage from an aircraft in the event of fire, comprising, a platform movable into alignment with an aircraft door, a tubular flexible shield surrounding the platform and having an outer rim adapted to contact an aircraft, a tubular fire shield telescopically enclosing said flexible shield, spring means for extending said fire shield toward an aircraft in the event of fire, and restraining means operable in opposition to said spring means to hold said fire shield in a retracted position, said restraining means including a fusible link breakable by excessive heat to release the fire shield to permit its movement against an aircraft under the influence of the spring means.

2. Apparatus according to claim 1 wherein said fire shield has an outer rim coated with heat expansible paint and adapted to contact an aircraft in the event of fire.

3. Apparatus for providing safe passage in the event of fire between two enclosures which respectively are an airport terminal and an aircraft, comprising, a platform extending between the enclosures and being movable into alignment with a door of an aircraft, a fire resistant shield for enclosing the platform between the enclosures in the event of fire, said shield being movable with respect to the platform from a retracted position where it is spaced from an aircraft to an extended position where it contacts the aircraft and shields the platform, and means for moving the shield from its retracted position to its extended position in response to an excessive ambient temperature which is of a magnitude existing in proximity to a fire and substantially greater than normal atmospheric temperatures; said means for moving the shield to its extended position including: means biasing the shield to its extended position, and thermally responsive means for holding the shield in its retracted position under normal atmospheirc temperatures and for releasing the shield for movement to its extended position in the presence of said excessive ambient temperature without the air of an external power source.

4. Apparatus according to claim 3 wherein the temperature responsive means includes a heat destructible member which separates in the presence of said high temperature.

5. Apparatus according to claim 3 wherein the biasing means is capable of moving the shield beyond its extended position, thereby enabling the biasing means to positively urge the shield against the other enclosure while in its extended position.

6. Apparatus according to claim 3 having means for limiting the velocity of the shield as it moves from its retracted position to its extended position.

7. Apparatus according to claim 3 wherein said fire resistant shield has an outer rim coated with heat expansible paint and adapted to contact an aircraft in the event of fire.

8. Apparatus for providing safe passage from an aircraft to a stationary terminal building in the event of fire, comprising, a platform movable into alignment with an aircraft door, a passenger loading bridge extending from the terminal building to the platform, a fire resistant shield movable with respect to the platform and adapted to provide an enclosed passageway leading from the aircraft door, said shield normally being in a retracted position which is spaced from the aircraft when the platform is aligned with an aircraft door, means for moving the shield to an extended position where it will contact an aircraft body in response to excessive temperature of a magnitude generated in the vicinity of a fire and substantially greater than normal atmospheric temperatures, said means for moving the shield including resilient biasing means and heat-destructible means for holding the shield in its retracted position, and means for limiting the velocity of the shield as it moves from its retracted position to its extended position.

9. Apparatus according to claim 8 wherein the velocity-limiting means includes: a device connected to the shield and having a chamber which changes its volume as the shield moves toward its extended position, and means permitting a limited flow of fluid between the chamber and another area during movement of the shield toward its extended position.

10. Apparatus according to claim 8 wherein said fire resistant shield has an outer rim coated with heat expansible paint and adapted to contact an aircraft in the event of fire.

11. Apparatus for providing safe passage from an aircraft to a stationary terminal building in the event of fire, comprising, a platform movable into alignment with an aircraft door, a passenger loading bridge extending from the terminal building to the platform, a fire resistant shield movable with respect to the platform and adapted to provide an enclosed passageway leading from the aircraft door, said shield normally being in a retracted position which is spaced from the aircraft when the platform is aligned with an aircraft door, means for moving the shield to an extended position where it will contact an aircraft body in response to excessive temperature of a magnitude generated in the vicinity of a fire and substantially greater than normal atmospheric temperatures, said means for moving the shield including resilient biasing means and heat-destructible means for holding the shield in its retracted position, said resilient biasing means being arranged to move the shield beyond its extended position in the absence of an aircraft adjacent the platform, thereby providing a biasing force between the shield and an aircraft body when the shield is in its extended position.

12. Apparatus according to claim 11 having a heat-resistant resilient sealing rim at the end of the shield adapted to lie against an aircraft.

13. Apparatus according to claim 11 wherein said fire resistant shield has an outer rim coated with heat expansible paint and adapted to contact an aircraft in the event of fire.

14. Apparatus for providing safe passage from an aircraft to a stationary terminal building in the event of fire, comprising, a platform movable into alignment with an aircraft door, a passenger loading bridge extending from the terminal building to the platform, a fire resistant shield movable with respect to the platform and adapted to provide an enclosed passageway leading from the aircraft door, said shield normally being in a retracted position which is spaced from the aircraft when the platform is aligned with an aircraft door, a flexible enclosure extending beyond the retracted shield to enclose the platform, means for moving the shield to an extended position where it will contact an aircraft body in response to excessive temperature of a magnitude generated in the vicinity of a fire and substantially greater than normal atmospheric temperatures.

15. Apparatus according to claim 14 wherein said fire resistant shield has an outer rim coated with heat expansible paint and adapted to contact an aircraft in the event of fire.

References Cited

UNITED STATES PATENTS

| | | | |
|---|---|---|---|
| 2,573,160 | 10/1951 | Norman | 160—1UX |
| 2,812,835 | 11/1957 | Smiley | 49—7 |
| 2,875,457 | 3/1959 | Read | 14—71 |
| 3,110,048 | 11/1963 | Bolton | 14—71 |
| 3,184,772 | 5/1965 | Moore | 14—71 |
| 3,189,142 | 6/1965 | Carlson | 49—7 |
| 3,315,291 | 4/1967 | Wollard | 14—71 |
| 3,369,264 | 2/1968 | Kurka | 14—71 |
| 3,383,796 | 5/1968 | Frederick | 49—7 |

JACOB L. NACKENOFF, Primary Examiner

U.S. Cl. X.R.

49—7